March 25, 1969   H. J. NICHOLS   3,434,747
QUICKLY OPERABLE KEYLESS COUPLINGS
Filed May 31, 1966
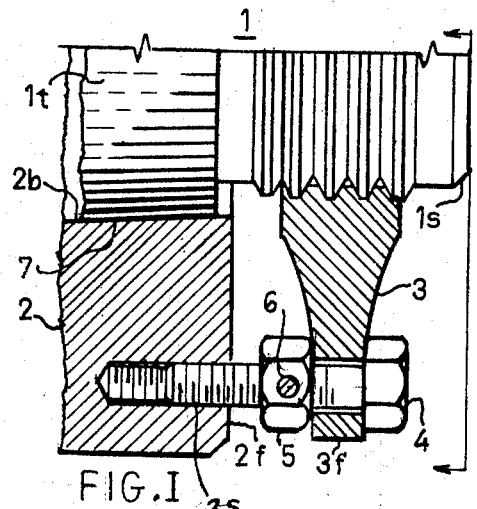
FIG. I
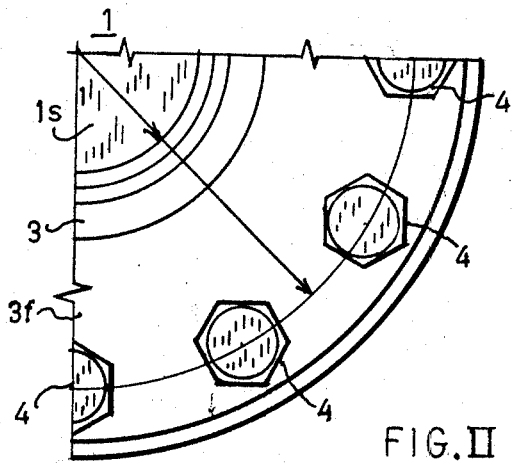
FIG. II
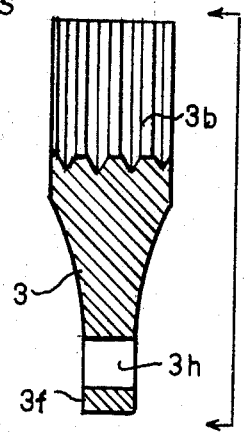
FIG. III
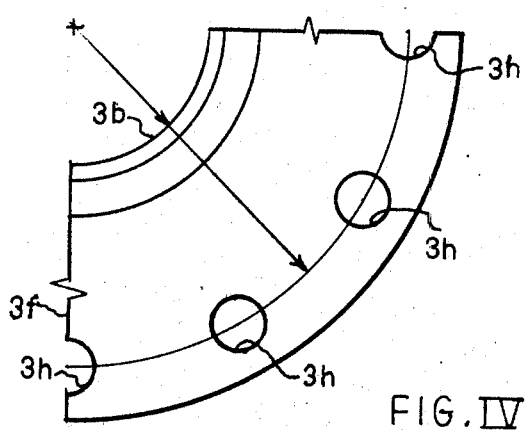
FIG. IV
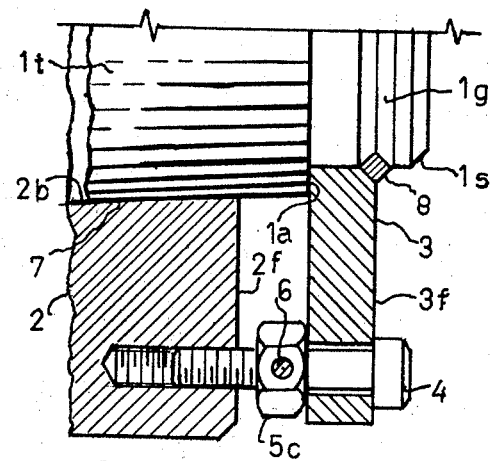
FIG. V
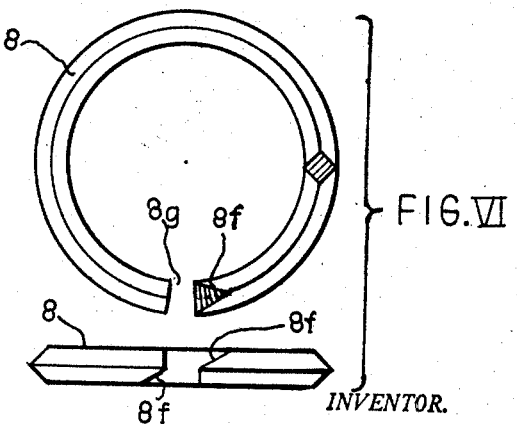
FIG. VI
INVENTOR.
Harry J. Nichols
BY United States Patent Office 3,434,747
Patented Mar. 25, 1969

3,434,747
QUICKLY OPERABLE KEYLESS COUPLINGS
Harry J. Nichols, 356 Briar Road,
Point Pleasant, N.J. 08742
Filed May 31, 1966, Ser. No. 554,113
Int. Cl. F16d 1/06; F16c 3/10
U.S. Cl. 287—53                6 Claims

ABSTRACT OF THE DISCLOSURE

This disclosure is of a hub-on-shaft coupling means for quickly and forcibly uncoupling a hub having a tapered bore, particularly a large hub such as that of a ship propeller, on a mating tapered shaft part and recoupling the mated parts by frictional means. The coupling means includes reversible push-pull screw-jack mechanism operable by an ordinary wrench, the main element of this mechanism being a resilient flexible disc, termed a "flexonut," adapted for fastening coaxially on the shaft adjacent an end of the hub and having a transversely flexible flange confronting the adjacent end of the hub. Multiple double-acting jack-screws mounted in holes in the flange and hub parallel to the hub axis, each screw having a wrench rotatable head, provide connecting links between the flange and hub which exert determinate thrust or tension forces therebetween according to the direction and degree of wrenching operation.

---

This invention relates to quickly operable keyless couplings and more particularly to novel and versatile coupling mechanism adapted in various embodiments to couple quickly and easily but forcibly a hub part on a tapered shaft part, whether solid, hollow or tubular; and to quickly, easily and safely but forcibly uncouple the hub part from the shaft part.

In the prior art, there have been various kinds of hub-on-shaft couplings, but those designed to transmit heavy torque have generally been provided with some sort of detachable auxiliary fastening device, such as a key, cross-pin, set-screw or clamp bolt, to prevent rotary slipping of the coupled parts. While commonly used, these couplings and devices have the drawbacks that the coupled parts must be tightly fitted at assembly to prevent the coupled parts working loose in service, and as a consequence the fastening devices and coupled parts are usually quite difficult to break loose and remove, particularly after corrosion has occurred. Hence, some special auxiliary appliance, commonly called a hub-puller or wheel puller, is generally required to remove an assembled hub from its shaft. In the case of keyed hub-on-shaft couplings, which are most often used for marine propellers and heavy machinery, a keyway must be machined both along the tapered shaft part and the mating hub bore; and in addition to the considerable cost of machining the keyways, providing the key and assembling it in the keyways, there is the further costly disadvantage that the strength of the shaft is substantially reduced by the keyway, hence a larger and more costly shaft is required. Further, ordinary methods of fixing large hubs on power shafts require special and costly dismounting tools and cause a substantial loss of time and money when the hub has to be removed from the shaft to inspect or repair or replace associated parts.

Maritime casualty statistics show that each year over two hundred ships lose their propellers while at sea. Such casualties entail millions of dollars in losses; and may endanger the ship, since propeller casualties usually occur in stormy weather. Moreover, propellers often work loose on the shaft when an ordinary rigid nut is used to secure the hub, even when the nut is wrenched tightly at assembly; because the ordinary rigid nut gradually relaxes its grip due to repeated expansion and contraction and eventual wear of the coupled parts. A loose propeller hub can cause fatigue cracks to develop in the propeller shaft with eventual shaft failure if such cracks are not repaired. While it may seem obvious that the possibility of a loose propeller could be eliminated merely by wrenching the nut tightly, if the nut is wrenched too tightly the metal in the hub may be strained beyond the yield point, hence the hub may become loose or cracked.

The principal object of the present invention therefore is to eliminate or overcome the limitations, disadvantages and drawbacks of the prior art by providing simple, versatile, practical, reliable and safe hub-on-shaft coupling means which will enable a hub to be quickly, easily and securely mounted on a shaft; and to quickly, easily and safely separate the coupled parts merely by the use of an ordinary manual wrench.

Another object of the invention is to provide means for making a rigidly coupled connection between a shaft and a hub mated thereon which eliminates the need for a keyway, key or other fastening device, and which will maintain the effectiveness of the coupled connection indefinitely in service.

A further object is to provide coupling means for securing a hub on a shaft which has built-in reversible push-pull screw-jack mechanism for forcibly locking the hub on the shaft and for forcibly unlocking and separating the hub from the shaft.

A further object is to provide a simple, practical and powerful screw-jack mechanism mounted about a ship propeller shaft which will enable the hub to be forcibly and safely unlocked and relocked merely by using an ordinary manual wrench.

A further object is to provide simple and practical hub-on-shaft coupling means which can be used to adjust accurately the coupling grip, so as to permit rotary slippage of the coupled parts without damage in the event of accidental application of overload torque.

A further object is to provide practical hub-on-shaft coupling means whereby frictional coupling can be augmented by the keying action of a myriad of embedded hard particles to produce a positive connection between the coupled parts.

A further object is to provide a novel elastic shaft-nut characterized by a disc-like shape and a round resilient flexible flange for providing a uniform axial clamping force acting to maintain the coupling grip on a hub mated on a tapered shaft.

A further object is to provide a simple self-unlocking and self-locking screw-jack coupling mechanism which can readily be applied to existing hub-on-shaft assemblies.

Other objects and improved features will be in part obvious and in part pointed out in connection with the following description, the accompanying drawings and the appended claims.

The invention will be more clearly understood from the following description relating to various embodiments of the invention and from the drawings, in which:

FIG. I shows a side view in quarter section of one embodiment of the invention as applied to a typical marine propeller assembly, in which the flexible shaft-nut and screw-jack mechanism are shown in position for unlocking or locking operation.

FIG. II shows a part end view of the assembly shown in FIG. I.

FIG. III shows a detail quarter sectional view of the flexible nut of the invention.

FIG. IV is a detail end view of the flexible nut section of FIG. III.

FIG. V shows a side view in quarter section of another embodiment of the invention as applied to an adjustable hub-on-shaft assembly.

FIG. VI shows a face view of the special thrust ring used in the assembly shown in FIG. V.

Relative to typical practical applications of the invention, customary maritime regulations require that each ship must have each propeller removed entirely from its propeller shaft at least once a year, and that a close inspection be made of the shaft at the location of the tapered part to determine if there are any cracks in its surface and any cracks found must be repaired by welding. At such inspections, it is usually quite difficult to break the hub loose from its shaft preparatory to removal, and heavy and powerful propeller pullers or jacks must be used to separate these parts. The teaching of the invention is therefore described in its application to uncoupling an existing large propeller from its shaft. However, the term shaft as used herein implies a shaft-like part, whether solid, hollow or tubular, as for example a machinery shaft or spindle, a round rod, stud, post or stem, etc. Likewise, the term hub as used herein implies a hub or hub parts, rotor, flange, collar, sleeve, pinion, gear, sprocket, pulley or like part adapted for coupling on a shaft.

Referring first to FIGS. I–IV, a coupling mechanism according to the invention and capable of locking and unlocking a hub on a large shaft when operated by an ordinary manual wrench is illustrated as being mounted on a conventional large marine propeller assembly. This assembly consists of a propeller shaft 1 carrying a marine propeller with a hub part 2 coupled thereon. Shaft 1 has a tapered part 1t which usually has a taper of one inch per lineal foot and a length of say twice the shaft diameter; and an adjoining short cylindrical stem 1s having screw threads of coarse pitch. Hub part 2 usually has a diameter of say one-and-a-half times the shaft diameter and a length somewhat less than the tapered part. Hub 2 also has an axial bore 2b which is tapered complementally to the tapered part, so that the hub and shaft are in tight contact when properly coupled. Hub 2 also has at its outer end a circular flat face 2f which is perpendicular to its bore. For the purposes of the invention, face 2f must be provided with a circular series of threaded holes 2s, herein termed "sockets," of proper size and number evenly spaced along a bolt-circle concentric with the bore of the bore of the hub. Also, the axis of each socket must be parallel to the axis of that bore. The principal element of the screw-jack mechanism is a special flexible metal nut 3, herein termed a "flexo-nut," which has certain mechanical characteristics which make it highly effective as a driving and locking nut. Flexo-nut 3 is characterized by a round disc-like shape with an axial bore 3b mounted rotatably on stem 1s and a resilient flexible flange having a rim portion 3f. The thickness of flange 3f is preferably tapered from near the bore to its periphery to render the flange substantially flexible transversely when put under axial loading by jack screws 4 as presently described. Flexo-nut 3 is also provided with a circular series of round bolt-holes 3h matching the locations of sockets 2s. A set of multiple wrench-head double-acting jack-screw 4, which preferably may be commercial alloy steel hex-head or socket-head cap-screws or bolts, must be of proper size and number and properly threaded to fit sockets 2s. Threaded nuts 5, herein termed "jack-screw nuts," and having a shape for turning by an ordinary wrench and threaded complementally to jack-screws 4, are each screwed on a jack-screw between the inner face of flange 3f and end face 2f as shown. These nuts are preferably each fitted with one or more set-screws 6 for fastening them in position so that they function as thrust-collars when the jack-screws function as push links. These nuts give the jack-screws equal capability for transmitting push or pull action to the flexo-nut, and can be wrenched simultaneously with the head to double the wrenching torque applied to the jack-screw. This is a substantial advantage when large jack-screws must be used.

The assembly of the coupling mechanism as illustrated in FIGS. I–II is preferably performed as follows: The jack-screws 4 are each inserted in a bolt-hole 3h in the flange of the flexo-nut 3 and the jack-screw nuts 5 are screwed on the jack-screws, which can then be used as crank-pins to screw the flexo-nut into place on the shaft, as shown. Since the flexo-nut need not be screwed up hard to force the hub up the taper as in ordinary practice, the flexo-nut can usually be easily screwed into place. Then by aligning the jack-screws with the sockets, the jack-screws can be screwed in until their heads reach the flange. Then by wrenching the jack-screws consecutively, a powerful cumulative axial elastic force is built up in the flange adjacent its rim portion and applied via the jack-screws to the hub, which force will pull the hub loose from the shaft; whereupon the propeller can be readily removed in the usual manner. It is to be noted that the usually difficult and dangerous operation of breaking the hub loose from the shaft can be performed merely by progressively tightening the jack-screws by an ordinary hand wrench, thus exerting a steady powerful pulling force on the hub; and that meanwhile the propeller is restrained against any sudden reactive movement which might endanger the workmen performing the operation. Thus, there is no need for any heavy and powerful and dangerous propeller puller, which is ordinarily required to remove a ship propeller from its shaft.

Referring to FIG. I, it seems evident that the propeller when remounted on the shaft can be pushed back into coupling position merely by reversing the order of operations, except that the jack-screw nuts 5 are preferably fastened in place on the jack-screws 4 by tightening set-screws 6. Thus, these nuts act as thrust collars 5c, and the flexo-nut can be flexed so as to push or pull the hub along the shaft merely by reversing the direction of wrenching the jack-screws. It will also be evident that the coupling mechanism of the invention provides many practical advantages and safeguards in coupling and uncoupling heavy hubs on large shafts. In this connection, it should be noted that whereas in ordinary practice the propeller hub must be pushed forcibly into tight position on the shaft by turning a single inefficient rigid nut, to which great torque must be applied by a giant wrench, the multiple jack-screws are highly efficient and operable by an ordinary manual wrench. In the event of an emergency, a single diver could remove and replace a large ship propeller by underwater operations—a feat hardly feasible by using the ordinary means and practices of the prior art.

It should be also noted that when the resilient flexo-nut is flexed by the jack-screws so as to push the hub up the tapered part to coupling position, it accumulates a powerful elastic thrust force which can be stored indefinitely and utilized to maintain a uniform axial coupling force. Since the flexible flange when stressed is more elastic than the coupled parts, the total axial force acting to maintain the grip of the hub on the shaft is twice the axial coupling force exerted on the flexo-nut. This follows from the fact that the axial force required to uncouple the hub from locked postiion must overcome the frictional force plus the axial coupling force applied by the flexo-nut. In the case of a marine propeller, when the vessel is driven ahead, the propeller thrust tends to push the hub from locked position must overcome the frictionmented by the propeller thrust; but when the shaft reverses, the propeller reverse thrust tends to uncouple the hub. Hence, if the flexo-nut maintains a coupling force of even one-half the maximum reverse thrust, the hub can not slip in normal service, even when frictional coupling alone is relied upon. Thus, it seems evident that the flexo-nut provides clamping and locking action far superior to the conventional rigid propeller nut, which tends to become loose in service due to vibration and fretting wear.

If the conventional rigid shaft-nut and key are discarded and the frictional grip between the hub and shaft produced by the coupling mechanism of the invention is relied upon to drive the propeller, some simple calculations are needed to guide the wrenching operation to ensure that the hub is adequately coupled on the shaft. The main factors to be calculated are the torque and thrust exerted by the propeller under extreme operating conditions, as in crash-top reversals. While the running thrust and torque of a propeller can be calculated from the engine power, shaft revolutions and speed of the vessel, different calculations are required to estimate the operating forces during maneuvers. It has been determined experimentally that the maximum propeller torque and thrust are calculable by the formulas:

(1) $$Qm = \frac{5{,}250 \times Pm}{N} \text{ foot-pounds}$$

(2) $$Tm = \frac{10 \times Qm}{D'} \text{ pounds}$$

where:

$Qm$ = Maximum shaft torque in foot pounds.
$Pm$ = Shaft horsepower, maximum.
$N$ = Shaft r.p.m. at $Qm$ torque.
$D'$ = Diameter or propeller in feet.
$Tm$ = Maximum propeller thrust in pounds.

Taking as a practical example the case of a high-speed twin-screw liner having turbine engines giving a shaft horsepower of 15,000 SHP at 250 r.p.m., the shaft diameter will be say 12 inches and the propeller diameter at 10 feet for a design speed of 30 knots. Accordingly, the maximum propeller thrust and torque can be calculated as:

(3) $$Qm = \frac{5{,}250 \times 15{,}000}{250} = 315{,}000 \text{ foot pounds}$$

(4) $$Tm = \frac{10 \times Qm}{10'} = 315{,}000 \text{ pounds}$$

It has also been established that modern alloy-steel cap screws can be safely wrenched to produce an axial force in tension or compression exceeding 30,000 pounds per square inch of screw section. Hence, a cumulative axial force exceeding the maximum propeller thrust can be produced by say 315/30 = 10 cap screws of one inch nominal diameter. And if a factor of safety based on twice the thrust is required, the same number of cap screws of 1.5" size, or twenty 1.0" size cap screws could be used. The desired wrenching torque can be estimated by the empirical formula:

(5) $$Qw = 0.2 \times d'' \times Ta$$

where $Qw$ = wrenching torque in inch-pounds.
$Ta$ = axial thrust, pounds.
$d''$ = diameter of screw, inches.

In this connection, it should be noted that the smaller the size of the jack-screws the less manual effort required to wrench the hub to the desired coupling position, hence in general more and smaller jack-screws are desirable.

Referring now particularly to FIGS. I–IV, in order to evaluate the merits of the coupling mechanism of the invention as applied to the illustrated embodiment, the limitations and drawbacks of ordinary rigid heavy nuts, when used to secure large propellers on large shafts, should be considered. When a massive hub is coupled on a large tapered shaft by a forced fit produced by screwing an ordinary nut against the end of the hub, the hub moves easily at first but very rapidly resists wrenching after the hub comes to snug tight position. Taking as a practical example a shaft having a diameter of twelve inches and a taper of one inch per lineal foot, with a ten inch nut with four threads per inch, the usual force fit for a hub-on-shaft coupling would amount to approximately 0.013 inch. This fit requires the hub to be forced up the shaft for a distance of 0.156 inch; which movement can be produced by turning the nut through an angle of $0.156/0.250 \times 360° = 225°$. At this "turn-of-nut" angle, the torque required to force the hub would be of the order of say 630,000 inch pounds and increasing rapidly; but if the wrenching operation were reversed, a wrenching torque of say one-tenth of that figure might back-off the nut and release its grip. Hence it becomes evident that a large rigid nut is quite inefficient as a jack-screw and unreliable as a lock-nut; hence in practice some auxiliary nut locking device such as a jam nut must be used. By way of comparison, when using the coupling mechanism of the invention, it may be assumed that twenty one-inch eight-pitch cap screws would be used as jack-screws, and that the flexure of the flexo-nut at the jack-screws would equal the hub movement. Under these conditions, the "turn-off-nut" angle would be $2 \times 0.156/0.125 \times 360° = 900°$ or 2.5 turns per screw; thus multiplying the mechanical advantage by a factor of four, while the work load per screw is reduced to one-twentieth. Hence, by comparison, the relative mechanical advantage of the screw-jack mechanism over a single nut would be approximately 80:1. It thus becomes evident that the coupling mechanism of the invention when operated by an ordinary manual wrench can exert a pushing force against the hub adequate to force the propeller up the taper to provide an accurately determinable grip adequate to transmit full torque.

In this connection, we can consider the magnitude of the frictional grip which can be produced by the coupling mechanism of the invention. A commonly accepted empirical formula for calulating the working strength of a shaft under torsion is:

(6) $$Qa = \frac{Ss \times d^3}{5.1} = 1175 \times d^3 \text{ inch pounds}$$

where $Qa$ = allowable torque in inch-pounds.
$d$ = diameter of shaft in inches.
$Ss$ = allowable torsional shear stress = 6,000 p.s.i.

Since this torque is effectively applied at the circumference of the shaft, the twisting moment is:

(7) $$Tm = \frac{F \times d}{2} = Qa \text{ inch pounds, whence}$$

(8) $$F = \frac{2 \times Tm}{d} = \frac{2 \times 1175 \times d^3}{d} = 2{,}350 \times d^2 \text{ pounds}$$

where F is the frictional force to prevent slippage of the hub on the shaft at full allowable torque. Hence, for example, in the case of a forced fit to seat a hub on a shaft ten inches in diameter, an axial pushing force of 235,000 pounds would be required; assuming that frictional force alone will be relief upon to prevent slippage of the hub under full allowable torque.

There is the further formula relating to frictional force:

(9) $$F = f \times C \text{ pounds}$$

where F is the total resistive force resulting from friction of surfaces under a total compressive force of C pounds, where $f$ is the coefficient of friction between the surfaces. In the assumed case of the steel shaft ten inches in diameter and taking a value of $f = 0.15$ (oily metal surfaces) the compression C to produce a frictional grip equal to allowable shaft torque would be:

(10) $$C = \frac{F}{f} = \frac{235{,}000}{0.15} = 1{,}565{,}000 \text{ pounds}$$

Assuming also that the tapered length of the coupled parts is equal to two shaft diameters, we have:

(11) $$C_{ave} = \frac{C}{2\pi \times d^2} = \frac{1{,}565{,}000}{2\pi \times 100} = 2{,}500 \text{ p.s.i.}$$

which is the unit surface pressure on the tapered surfaces.

It thus becomes apparent that the coupling can slip without damage at full allowable torque, provided a proper lute is applied between the tapered surfaces which will prevent galling or seizing of the surfaces. To meet these requirements, a thick lute of white and red lead in a linseed oil vehicle may be applied to the tapered surfaces at assembly. It follows that the coupling mechanism can be properly designed to allow a hub to slip on its shaft when an overload torsion occurs, as when a propeller strikes an obstruction. Such accidents may be of frequent occurrence during some hazardous marine operations, such as ice-breaking, log-towing, etc. and may also occur during ordinary operations in harbors, rivers and canals, and even at sea. Hence the capability of the coupling mechanism to provide for slippage in the event a predetermined torque is exceeded is a highly advantageous feature.

In some applications, however, it may be advantageous to provide a coupling assembly which will ensure a positive driving connection up to the torsional limit of the shaft, but which will prevent shaft damage or failure from accidental overload slippage; and will enable the hub to be easily removed, even after long and hard service. Such conflicting requirements can be met by the coupling mechanism of the invention by using a special locking lute 7, consisting of a lubricating vehicle carrying hard particles of minute controlled size, as for example fine emery powder or fine beach sand. This lute is evenly distributed between the tapered parts at assembly, and for best results the particles must be harder than both the hub and the shaft, so that when the parts are forced together to coupling position by the screw-jack mechanism, the particles will be embedded in both surfaces. Thus the particles act as a myriad of miniature keys which provide determinable positive locking. Yet if the coupling parts slip, the lute prevents seizing and the resilience of the flexo-nut restores positive locking action. For further particulars, reference is made to my United States Patents Nos. 2,617,672 and 3,143,366.

Referring now to FIGS. V–VI, such illustrate the application of the invention to a medium or large hub-on-shaft coupling specially designed to slip repeatedy at some predetermined torque load. The general elements and construction of the coupling mechanism is similar to that described in connection with the prior embodiment, but the rotary connection between the shaft and flexible nut is modified to eliminate the screw threads in its bore. Accordingly, the shaft stem 1s is provided with a shoulder 1a and a circumferential V-groove 1g as shown, for purpose of detachably fastening the flexible disc 3 on stem 1s so as to be rotatable without axial movement. The axial bore of flexo-nut 3 is therefore left plain without threads, but is provided with a chamfer at the outer rim of the bore, this chamfer being contiguous with V-groove 1g as shown. A resilient plain thrust ring 8, consisting of a single coil of spring wire—wire of square-section and wound edgewise, is provided to fasten flexonut 3 on stem 1s; the diameter of thrust ring 8 being adapted to seat securely in V-groove 1g. Thrust ring 8 also has a bevel facet 8f at each end but on opposite faces, and a clearance gap 8g to enable an end of the ring to be pried out of assembled position in V-groove 1g; thus permitting the ring to be removed for disassembly purposes. This construction enables thrust ring 8 to be slid along stem 1s and snapped into V-groove 1g when flexo-nut 3 is in place, so as to prevent axial displacement while permitting rotation in the event of slippage of the coupled parts. When jack-screw nuts 5 are turned along jack-screws 4 until close to flange 3f, each nut is preferably fixed against turning on its jack-screw by a set screw 6 or cross-pin or other suitable detachable fastener means. When these nuts are thus fixed in place, they become thrust collars 5c; and flexo-nut 3 can be forced gradually either way merely by turning jack-screws 4 in either direction; thus providing micrometric adjustment of the hub setting and gripping force.

The mounting of the hub on the shaft and the coupling operations can be performed as in the prior case, but it is assumed that the jack-screws are precisely adjusted to regulate the gripping force to permit slippage at some predetermined torque load. Also, by using a proper lubricating lute between the tapered parts to facilitate coupling and to prevent seizing, as for example extreme pressure (EP) grease, the coupling can slip repeatedly without damage or becoming loose. In this connection, it may be noted that in the first embodiment, slippage of the hub on the shaft tends to loosen or tighten the grip, depending on the direction of rotation; whereas with the second construction the gripping force is maintained by the flexonut whether the slippage is in either direction. This feature is highly advantageous where frequent slippage may occur in normal operations.

In summary, it will be observed that in each embodiment illustrated, the shaft has a tapered part and the hub has a complementally tapered bore; and a simple but powerful screw-jack mechanism is mounted around the shaft whose main function is to forcibly couple and uncouple the mated tapered parts. The shaft also has a cylindrical part adjoining the tapered part; and the hub has an end face with multiple screw-threaded sockets arranged in a circle around the bore. The screw-jack mechanism comprises a special flexible nut or disc fastened rotatably on the shaft and mounting multiple wrench-head jack-screws each screwed into a socket and fastened rotatably in a bolt-hole in the flange of the flexible nut. When wrenched consecutively in one direction, the jack-screws forcibly push the hub up the tapered part to provide an accurately determinable grip thereon; and when so turned in the reverse direction, the jack-screws gradually but forcibly pull the hub down the tapered part; thus uncoupling the hub from the shaft. A special lute composition is preferably distributed evenly between the tapered parts at assembly; thereby facilitating coupling and uncoupling operations; and in the event of slippage due to overload torque, the lute prevents galling or seizing of the coupled parts. If the coupling is designed to transmit a certain torque without slippage, the lute composition is preferably provided with hard particles which become embedded jointly in the tapered parts at the coupling operation and thus lock the coupled parts positively together, and also prevent bonding or seizing of the coupled parts. The flexible nut also maintains indefinitely a powerful axial clamping force against the hub, thus preventing relaxation of the grip of the hub on the shaft and eliminating the need for a key, lock-nut or other nut-locking device, which is required by prior practice.

Moreover, the particular construction of coupling mechanism disclosed provides an extraordinary advantageous combination of practical characteristics and features; namely, simplicity of form and structure, minimum size and weight with maximum strength, low cost and ease of production; ease of assembly, operation and disassembly without special tools, eliminates keyways and keys, self-locking and shake-proof, versatile and adaptable to existing hub-on-shaft couplings, contributes to safety and eliminates propeller shaft failures, saves time and money, reduces casualties and repairs, etc.

Without further analysis, the teaching of the invention and various modes of putting the invention into practice will be evident from the foregoing. However, as many changes could be made in carrying out the above constructions without departing from the scope of the invention, it is intended that all matter contained in the above description or shown in the accompanying drawing shall be interpreted as illustrated and not in a limiting sense.

I claim:

1. In a hub-on-shaft coupling assembly including a shaft with a tapered part, and an axial hub part with a tapered bore complemental to said tapered part and mounted coaxially thereon, said hub part having multiple longitudinal screw-threaded bolt sockets arranged around said bore parallel to its axis; a quickly operable reversible push-pull screw-jack mechanism mounted around said shaft for forcibly coupling and uncoupling said parts upon operation by a wrench comprising the coordinated combination of: a driving disc fastened coaxially on said shaft adjacent said hub, said disc being of a material and so configured that its rim portion is axially flexible; said rim portion having transverse bolt-holes matching said sockets; and wrench rotatable jack-screw means for flexing said rim portion including multiple, double-acting jack-screws each threaded into one of said sockets and extending through one of said bolt-holes and a pair of wrench rotatable, rim-abutting elements mounted on each said jack-screw and disposed adjacent opposite faces of said rim portion; whereby consecutive wrenching operation of said jack-screw means in one direction flexes said rim portion so as to forcibly drive said hub part up said tapered part to coupled position; and similar operation of said jack-screw means in the reverse direction flexes said rim portion so as to pull said hub part down said tapered part away from coupled position.

2. The combination set forth in claim 1, which further includes a lute composition distributed evenly between said tapered parts for facilitating and augmenting said coupling operation and for preventing seizing of said parts.

3. In a reversible wrench-operable push-pull appliance for uncoupling and coupling a hub part having a tapered bore mated coaxially on a shaft with a complemental tapered part and having multiple longitudinal screw-threaded bolt sockets; the coordinated combination comprising: a disc fastened coaxially on said shaft including a rim portion, said disc being of a material and so configured that its rim portion is axially flexible and said rim portion having transverse bolt-holes matching said sockets; and multiple wrench rotatable jack-screw means including threaded bolts each secured in one of said sockets and extending through one of said bolt holes and wrench interengaging and rotatable elements operatively mounted on each said bolt and disposed adjacent the opposite faces of said rim portion, said jack-screw means being operative to flex said flange in opposite directions according to the direction of wrenching.

4. The combination set forth in claim 3, which further includes a lute composition distributed evenly between said tapered parts for facilitating and augmenting the coupling and uncoupling operations and for preventing seizing of the tapered parts.

5. A hub coupling comprising, in combination with a hub having an axial bore configured to mate with a complementary part of a shaft, a circular driving disc having an axial bore mounted on said shaft adjacent said hub and having a rim portion, at least said rim portion being of a material and so configured as to be axially flexible and being provided with screw-clearance holes parallel to the bore axis and arranged in a circle concentric therewith, and multiple double-acting jack-screw means for connecting said hub and disc and for flexing said rim portion in alternate directions; said jack-screw means comprising bolts extending through said holes and being threadedly connected to said hub, and a pair of wrench interengaging and rotatable elements mounted on each said bolt and being disposed to adjacent opposite faces of said rim portion; whereby said disc responsive to reversible tightening operation of said whench-rotatable means is effective to drive said hub forcibly in reverse directions coaxially along said shaft.

6. The combination set forth in claim 5, which further includes a lute composition distributed between said hub and shaft part for facilitating and augmenting coupling and uncoupling operations thereof.

References Cited

UNITED STATES PATENTS

| | | | |
|---|---|---|---|
| 2,396,414 | 3/1946 | Firth | 287—52.06 |
| 2,554,348 | 5/1951 | Rudolph | 287—52.06 |
| 2,617,672 | 11/1952 | Nichols | 287—126 XR |
| 2,706,502 | 4/1955 | Fink et al. | 29—256 XR |
| 2,835,518 | 5/1958 | Naab | 287—52.06 |
| 3,143,366 | 8/1964 | Nichols | 287—53 |

FOREIGN PATENTS 546,986   9/1922   France.

CARL W. TOMLIN, *Primary Examiner.*

ANDREW V. KUNDRAT, *Assistant Examiner.*